United States Patent [19]
Anderson et al.

[11] Patent Number: 5,861,750
[45] Date of Patent: Jan. 19, 1999

[54] GEOPHYSICAL METHODS AND APPARATUS FOR DETERMINING THE HYDRAULIC CONDUCTIVITY OF POROUS MATERIALS

[76] Inventors: Dennis M. Anderson, 3990 Timberline Dr., Carson City, Nev. 89703; William J. Ehni, 5462 Salk Rd., Carson City, Nev. 89706

[21] Appl. No.: 839,570

[22] Filed: Apr. 15, 1997

Related U.S. Application Data

[63] Continuation-in-part of Ser. No. 370,102, Jan. 9, 1995, abandoned.

[51] Int. Cl.$^6$ ..................................................... G01V 3/06
[52] U.S. Cl. ........................... 324/347; 324/717; 324/323; 73/152.06
[58] Field of Search .................................. 73/38, 152.05, 73/152.06, 152.07; 324/715, 717, 718, 375, 376, 347

[56] References Cited

U.S. PATENT DOCUMENTS

| | | | |
|---|---|---|---|
| 3,982,177 | 9/1976 | Walker | 324/376 |
| 4,166,244 | 8/1979 | Woods | 324/715 |
| 4,907,448 | 3/1990 | Givgns | 73/38 |
| 5,105,154 | 4/1992 | Givgns | 324/376 |
| 5,209,104 | 5/1993 | Collins | 73/38 |

OTHER PUBLICATIONS

1942 AIME vol. 146, Petroleum Development and Technology G.E. Archie, pp. 54–61.
1986 Parasnis, D.S., Principles of Applied Geophysics, Fourth Ed. Chapman & Hall, NY NY, pp. 119–125, Equation #4.25 –pp.122.
1966 Handbook of Physical Constants, Clark, Sec 26, Keller, G.V. Elec. Properties of Rocks, pp. 553–577, Equation #pp.555.
1932 Schlumberger, M. and C., Tech. Pub. No. 462, AIME, Pp. 1–38.
1929 Schlumberger, M. and C., Tech. Pub. No. 315, AIME, pp. 1–16.
1950 Wyllie & Rose, Petroleum Transactions, AIME, vol. 189, 1950 pp. 105–118.

*Primary Examiner*—Josie Ballato
*Assistant Examiner*—Jose M. Solis

[57] ABSTRACT

A method and device for determining the hydraulic conductivity of porous materials is disclosed. The method uses a general permeability equation for calculating the hydraulic conductivity. The resistivity of the porous material is measured when the porous material is at least partially saturated with a pore filling fluid. Other data, such as a formation factor, permeability constants of the porous material, and in situ moisture content of the porous material may also be derived or measured. The geophysical permeability equation is then used to calculate the hydraulic conductivity of the porous material from the measurements and data. Methods are also disclosed which provide an average hydraulic conductivity over a given area. A device for determining hydraulic conductivity of a porous material is disclosed which utilizes a plurality of electrodes for conducting electricity to the porous material. A resistivity meter may be attached between the electrodes for measuring the resistivity. The device may include an electrode positioning device for positioning the electrodes in a predetermined spacial relationship.

11 Claims, 2 Drawing Sheets

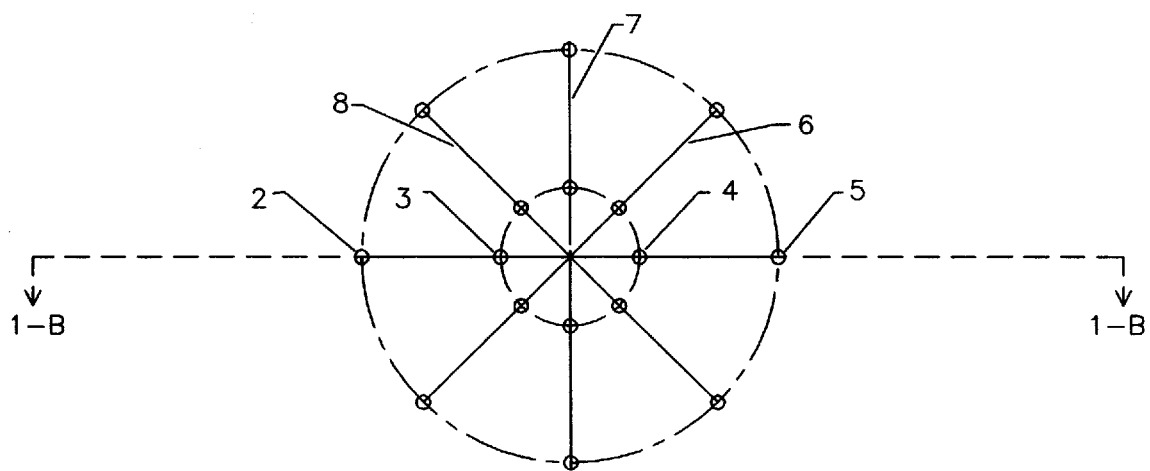
Fig. 1-A
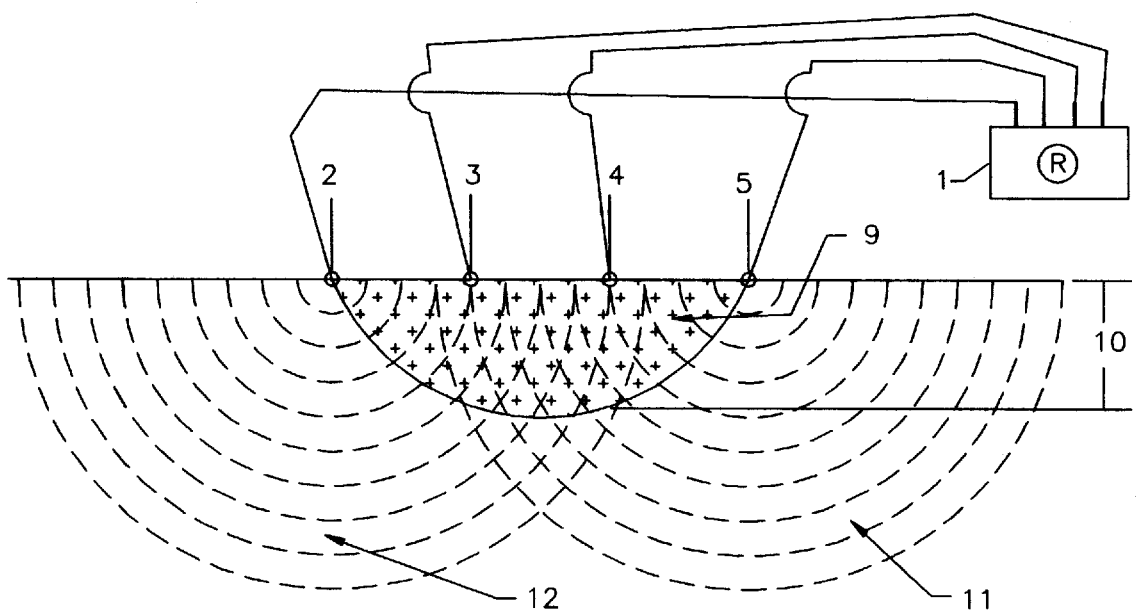
Fig. 1-B

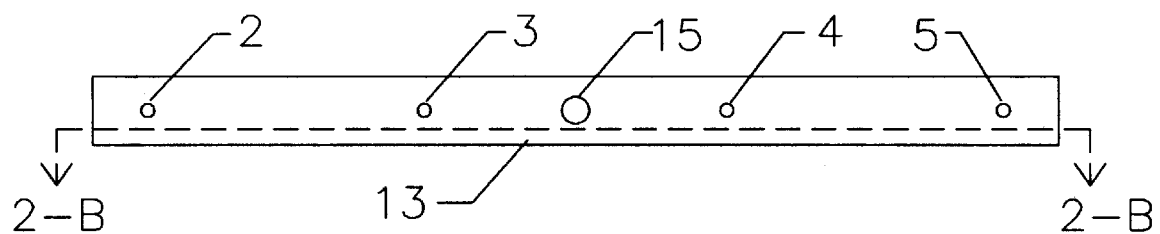
Fig. 2-A
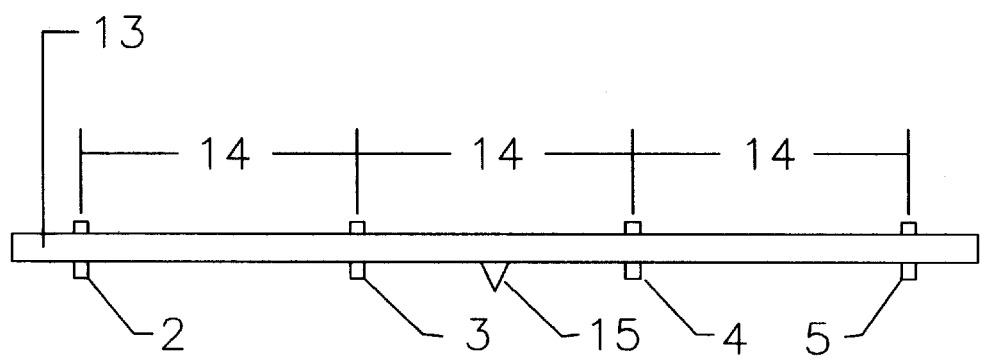
Fig. 2-B

GEOPHYSICAL METHODS AND APPARATUS FOR DETERMINING THE HYDRAULIC CONDUCTIVITY OF POROUS MATERIALS

CROSS REFERENCES TO RELATED APPLICATIONS

This application is a continuation-in-part of application Ser. No. 08/370,102 filed on Jan. 9, 1995, now abandoned.

BACKGROUND OF THE INVENTION

1. Field of Invention

This invention relates to a geophysical method and apparatus for determining the hydraulic conductivity (also known as permeability or coefficient of permeability) of porous materials.

2. Description of Related Art

The primary objective of the invention is to provide on-site/immediate hydraulic conductivity data for construction material which is used for construction quality control and quality assurance (QC/QA), as well as field documentation for submittal to a regulating authority.

Federal and/or state environmental regulations require a QC/QA program be implemented during the construction of landfills, waste disposal facilities, and certain industrial process components that are built to serve as both process containment units and waste containment systems for environmental protection. The QC/QA program involves on-site technical or engineering staff that continuously monitor construction activities and prepare certified engineering reports as to the quality of the facility construction compared to the facility design.

The construction period for building landfills, waste disposal facilities, and certain industrial process components can range from several days to several months for the initial construction, and is often an on-going process throughout the life of a facility, as is the case in construction of new waste disposal cells at a landfill.

Clay based material liners (porous material) are used in the mining, solid waste, and construction industries as impervious fluid containment barriers for the horizontal transport of process fluids or the containment of pollutants for the protection of groundwater resources. Clay based material capping systems are routinely used in waste containment or disposal systems to prevent precipitation from infiltrating into a waste containment cell, this precludes the development of leachate contaminants that could migrate downward and impact groundwater resources.

Clay liners are normally constructed to very prescriptive hydraulic conductivity design specifications as dictated by engineering requirements or state/federal regulations. An example of a regulation that calls for a prescriptive clay liner specification is the Nevada Regulations Governing Design, Construction, Operation and Closure of Mining Operations; NAC 445.242 through 445.24388. These regulations contain a minimum design criteria for the construction of leach pads and other non-impounding surfaces designed to contain and promote horizontal flow of process fluids. The regulation states:

"Containment of process fluids must consist of an engineered liner system which provides containment equal to or greater than that provided by a synthetic liner placed on top of a prepared subbase of 12 inches of native, or imported or amended soil, which has a maximum recompacted in place coefficient of permeability: of $1 \times 10^{-6}$ cm/sec; or . . . "

The soil liners or infiltration barriers normally use clay based material, consisting of high clay content soil that have physical characteristics that enable standard construction techniques for the placement of the material to meet the design specification and operational permeability coefficient criteria. Conventional testing of clay liners involves the physical measurement of fluids migration into an in-place liner or through a lab sample.

Field measurement techniques, such as a sealed single, or double, ring infiltrometer, generally takes several days, weeks or even months to complete a test which causes construction and project development delays. Field measurements are typically conducted on pre-construction test pads that are built to assess the construction material and construction techniques prior to actual construction. The hydraulic conductivity test data are correlated with other material specifications including material gradation, plastic limit, Atterberg limit, density, and moisture content. The relationship between the hydraulic conductivity and the other tests is then used to develop a construction quality assurance/quality control program. The construction is generally then monitored and managed with the use of geotechnical tests, such as nuclear density and moisture content of the soil during construction.

Existing technologies for measuring hydraulic conductivity of a porous medium:

The state-of-the art methods for field investigation of clay-based liners or caps for waste disposal facilities includes the Sealed single ring infiltrometer (SSRI), and the Sealed double ring infiltrometer (SDRI). Other tests that are currently being used and are in the process of establishing American Society for Testing and Materials (ASTM) standards are borehole tests which include the BAT Test and the Boutwell Permeameter. A combination field sampling and lab testing program is also routinely used to assess the hydraulic conductivity character of a clay-based soil liner that is under construction. All of the current tests measure the direct flow of fluids through either a test pad at a facility or the installed liner at the facility. The existing technologies do not use geophysical methods as a part of the operations and calculations. The existing field technologies are described below.

Sealed single ring infiltrometer (SSRI): Tests are typically performed as construction quality assurance test prior to or during the installation of a waste disposal clay-based liner or caps, or component parts of a liner composite system. The tests take several days, weeks or months to complete. The tests are usually performed on a test pad, and therefore do not measure the actual hydraulic conductivity of the installed liner, or component part of a composite liner system. The end result of the test is that the investigator has a data set for the test pad. The data set typically includes hydraulic conductivity of the test pad, and construction parameters such as in-place density and moisture, gradation analysis, plastic index, etc., which are then used in the QC/QA program during the actual constructed clay based liner. The tests generally assess a relatively small volume, typically less than one cubic foot. This sample size is generally to small to evaluate the secondary features preferential flow paths) of the porous material.

Sealed double ring infiltrometer (SDRI): Tests are similar to SSRI, but more sophisticated and elaborate in measuring the hydraulic conductivity of a test pad. The tests are typically performed over a larger area than the SSRI, and therefore they have a greater ability to evaluate secondary macro features. The tests generally assess a volume of three to five feet in diameter by 12 to 18 inches thick. This sample size is thought to be large enough to evaluate the secondary features (preferential flow paths) of the porous material, thereby examining macro defects.

BAT Test: This test is a destructive test that requires drilling a small borehole (typically 1 inch) into the liner that is being investigated. The volume of influence for the testing is thought to be a sphere with a 3 to 6 inch diameter. A probe is sealed in the borehole during the testing and water is extruded into the surrounding environment. The rate of flow and the pressure is measured and the hydraulic conductivity is calculated for the porous material at the discreet test site. The tests are comparably inexpensive with respect to contemporary techniques, and take several minutes to a few days.

Boutwell Permeameter, also referred to as the Two Stage Borehole Permeameter: This test is a destructive test that requires grouting the testing apparatus into a borehole in the test site. A testing construction quality assurance program usually involves a series of tests to evaluate the overall permeability characteristics of a liner system.

Field/Lab Combination Testing: In addition to existing field technologies that are available to assess the hydraulic conductivity, a combination field/lab testing program is sometimes used to determine the permeability characteristics of a given construction project. In general, the procedures require obtaining a sample of the material that will be installed as the clay liner and then performing lab tests on the sample. The samples are collected in one of two ways. The preferred sample collecting method involves driving a two inch, or a two and one half inch diameter, six inch long brass tube into the test pad, or construction material borrow source and then performing the tests on the "undisturbed" sample. The term undisturbed is however misleading because the soil sample is dedensified during the collection process.

A second method of obtaining a clay liner sample is to measure the density of the in-situ soil, then collect the sample by digging enough soil product out of a hole in the vicinity of the density test, followed by remolding the soil product into a cylinder in the lab prior to performing the permeability test. Lab tests that are performed on the sample include either a "Rigid Wall" or a "Flexible Wall". The tests typically take three to five days to perform, once the sample arrives at the lab. The turn-around time from sample collection, and lab testing, to useful analytical results is typically five to seven days. The accuracy of this test procedure is thought to be in the order of plus or minus a full magnitude (i.e. $\pm 1 \times 10^{-1}$ cm/sec). The tests cost between $250 and $300 per each.

Test limitations for the above mentioned techniques are as follows:

1. The testing times are generally long, requiring several days to months to complete.
2. With the exception of a large scale SDRI, the tests generally assess a very small volume of compacted clay liner material, less than one cubic foot. This sample size is too small to evaluate the secondary features (preferential flow paths) of the test site. Not examining macro defects is a major disadvantage.
3. Some of the testing procedures require a relatively thick test zone, particularly the Boutwell Permeameter.
4. The testing programs are expensive, and will typically cost between $10,000 and 30,000 (e.g. one SDRI setup generally cost $25,000).
5. The testing procedures are highly specialized and require a highly skilled technician for setup and monitoring over the test period.
6. The tests are usually performed on a test pad, and therefore do not measure the actual hydraulic conductivity of the installed liner or component part of a composite liner system.
7. The tests are fixed assembly and the measurements are made at a unique fixed site over a single period of time. There is no ability to repeat the test once the test has been completed and the assembly has been removed.
8. BAT Test, the Boutwell Permeameter, and the combination field/lab testing procedure are destructive testing procedures.

The state-of-the-art technologies that are in use today have very little in common with the present invention. The existing technologies utilize physical fluid measurement techniques to determine the migration rate of fluids through soil products. The tests are generally slow, destructive, cumbersome, expensive, and often inaccurate.

Development of a geophysical method and apparatus for determining the hydraulic conductivity of porous materials at the earths surface utilizes three primary principles of applied geophysics. All three of the geophysical principals had their origin in the petroleum industry and were not considered, assessed, examined, or adapted for use the geotechnical engineering until Anderson and Ehni recognized their potential, conducted research to assess adaption of the principals, and developed the invention that is presented herein.

The first geophysical principal is based on work by Conrad and Marcel Schlumberger (1930) who developed a system of measuring the resistivity of surface rocks with electrodes deployed on the surface. The technique ultimately evolved into an expanding electrode array with several resistivity measurements at various electrode spacings. The electrode separation for a typical Schlumberger sounding will usually cover several measurements over a span of several hundred feet. The objective of the investigation is to measure the resistivity of several layers of rock formations in the subsurface. The variations in resistivity was used to interpret the subsurface geology. They later applied this technology to evaluating well bores drilled for petroleum exploration.

The second geophysical principal uses G. E. Archie's 1941 work. Archie presented his work in 1942 in a paper entitled *The Electrical Resistivity Log as an Aid in Determining Some Reservoir Characteristics*. Archie determined porosities of various materials using resistivity measurements. Mathematical formulas that G. E. Archie derived, and other relevant mathematical formulas that have been adapted for use in the invention, are outlined in the Description of the Preferred Embodiments.

The third geophysical theory expands on the permeability research developed by Tixier (1949) and Wyllie and Rose (1950). They recognized that permeability is directly related to porosity and calculated permeabilities of subsurface formations derived from resistivity data made from well bore measurements. Their work was specific to reservoir rock analysis through borehole testing in the petroleum industry.

By combining these three principles, which were directed toward the petroleum exploration and production industries, an accurate method has been developed for determining the hydraulic conductivity of porous materials at the near surface.

Earlier researchers never provided a process or method for surface investigations of hydraulic conductivity because their focus was directed towards identifying and assessing highly permeable petroleum reservoir rock that were typically sandstone formations at considerable depth (i.e. 3000 to 10,000 feet deep).

The technique developed by Anderson and Ehni employs a relatively small separation for the electrodes separation (i.e. 4 to 9 cementers). The objective of Anderson and Ehni's initial work was to obtain a single resistivity value for a relatively thin homogeneous material. This stand alone resistivity number is then used to calculate the hydraulic conductivity of the investigated surface zone. Anderson and Ehni did not test for changes in resistivity that represent changes in geologic formations. This premise, of using a unprecedented short electrode spacing for surface investigation, enabled the measurement of single layers of soil products (i.e. clay or soil layers).

Permeability calculations developed by Wyllie and Rose in 1950, or Tixier in 1949, use resistivity measurements and porosity calculations as developed by G. E. Archie, combined with a formation factor or constant. These formation and/or solution factors were empirically derived through experimentation and testing for repeatability.

The following prior art reflects the state of art of which the applicant is aware and is included herewith to discharge applicant's duty to disclose relevant prior art. However, that none of these references teach singly nor render obvious when considered in any conceivable combination the nexus of the instant invention as disclosed in greater detail hereinafter and as particularly claimed.

Archie, G. E., The Electrical Resistivity Log as an Aid in Determining Some Reservoir Characteristics, Transaction of the American Institute of Mining and Metallurgical Engineers, Vol. 146, 1942

Schlumberger C., and Schlumberger M.; Depth of investigation attainable by potential methods of electrical exploration . . . ; AIME Technical Publication No. 315; 1930

Schlumberger C., Schlumberger M., Leonardon E. D.; Electrical Coriing: a Method of Determining Bottomhole data by Electrical Measurements.; Transactions of the AIME; Technical Publication No. 462; 1932

Vingoe, P., Electrical Resistivity Surveying, ABEM Geophysics & Electronics, Geophysical Memorandum 5/72; 1972

Wyllie, M. R. J. and Rose, Walter D., Some theoretical Considerations Related to the Quantitative Evaluation of the Physical characteristics of Reservoir Rock from Electrical Log Data, Gulf Research and Development Co., AIME Petroleum Branch; 1949

Chapman et al., U.S. Pat. No. : 4,703,279, Method of Interpreting Impedance Distribution of an Earth Formation Penetrated by a Borehole Using Precursor Data Provided by Moving Logging Array Having a Single Continuously Emitting Current Electrode and a Multiplicity of Potential Electrodes, October 1987

The present invention provides a solution to an existing, unsolved problem. The geotechnical problem involves efficient and accurate measurement of hydraulic conductivity of clay-based soil liner as used in the mining and industrial process facilities, and waste disposal and/or containment facilities. The present invention solves this geotechnical engineering problem by uniquely combing several previously uncombined technologies from the totally unrelated and non-analogous art of oil well production and oil reservoir analysis.

Those skilled in the art of geophysical borehole testing never before addressed the unrelated field of geotechnical engineering aspects of assessing hydraulic conductivity of materials on the earths surface. Even if those skilled in the art of geophysical borehole testing tried to combine the non-obvious multiplicity of geophysical steps that were combined by D. M. Anderson and W. J. Ehni, they would have failed for several reasons. Research and Development by D. M. Anderson and W. J. Ehni provided a knowledge that the resistivity of the permanent was a very important key to assessing the hydraulic conductivity of a clay-based soil liner. In addition, the mathematical constants that are used in the equations are derived from the field of geotechnical-soils engineering.

A second important step, that would be non-obvious to those skilled in the art of geophysical borehole testing, includes the use of existing geotechnical engineering techniques as a means of determining the formation factors that are needed to calculate the clay-based soil hydraulic conductivity. The multiplicity of steps that are combined and modified to yield the end result took the recognition that an existing problem, followed by research and development to employ unrelated technologies in a non-obvious manner.

Development of new geotechnical engineering, i.e. a geophysical method and apparatus for determining the hydraulic conductivity of porous materials utilizes three primary principles of applied oil field geophysics. By uniquely modifying and combining three geophysical principles that were directed primarily toward the petroleum exploration industry in the 1930's through the early 1950's, an accurate method has been developed for determining the hydraulic conductivity of porous materials at the near surface.

SUMMARY OF INVENTION

1. Objects of the Invention

The objective of the invention is to provide on-site/immediate construction material characteristic data (i.e. permeability data) that is used for construction quality control and quality assurance, as well as field documentation for submittal to a regulating authority. The technique measures the hydraulic conductivity of a sufficiently large volume to account for primary hydraulic conductivity of a discreet, ideal specimen, as well as secondary features of a clay based liner or cap system.

Secondary features will include identifying preferential flow paths that often dominate the overall performance of a containment or infiltration barrier system by measuring the horizontal homogeneity, including the horizontal hydraulic conductivity.

The significance of the testing procedure lies in its ability to accurately measure the hydraulic conductivity of a volume of installed material that will include imperfections as preferential flow path features. The imperfections, such as desiccation cracks or poor interface contacts between construction lifts, are likely to cause preferential flow paths. In addition the process enables a method of measuring the change in hydraulic conductivity over time, days, weeks, months or even years. This is accomplished by installing a permanent set of electrodes that are stationed in a set array. The electrode array is then energized and tested over a period of time.

These and other objects of the present invention may be realized by reference to the remaining portions of the specification, claims, and abstract.

2. Brief Description of the Invention

The invention enables fast, efficient, and accurate testing of hydraulic conductivity of porous mediums (e.g. clay based liners). The field measurements can be performed during construction of low permeability clay liners or caps. The tests will afford the construction contractor and facility owner with increased production rates for installation, and will dramatically reduce the liability of the QC/QA firm by providing immediate permeability information and field documentation at the time of construction.

The volume of investigated clay based liner material is large enough to enable the assessment of secondary features (preferential flow paths) in the liner. The secondary features that are measured are an integral part of the overall liner's quality during construction and performance over time. The field tests are non-destructive and take approximately 10 minutes. Other techniques currently used for this purpose are slow and cumbersome. The following discussion compares the existing technology with the invention.

The advantages of the invention over existing technology are as follows:

1. Takes a fraction of the time to perform and calculate the results. 10 minutes to a half an hour compared to several days, weeks or months;
2. measures a sufficiently large volume of material, so that macro defects will be investigated;
3. is capable of assessing any given thickness of either installed or natural in-situ clay based material;
4. generally costs several times less than the current tests cost;
5. is capable of being performed by a technician with a moderate skill level, as opposed to a highly skilled technician;
6. is performed on the actual facility component being installed;
7. has the capacity to be repeated as many times as desired to investigate conditional changes or stability in the unit being tested; and,
8. is non-destructive.

The invention represents a significant improvement in QC/QA and environmental technology. The invention measures soil hydraulic conductivity with geophysical technology, whereas contemporary technology relies on measurements of strictly physical fluid flow conditions.

The above description sets forth, rather broadly, the more important features of the present invention or that the detail description thereof that follows may be better understood in order that present contributions to the art may be better appreciated. There are, of course, additional features of the invention that will be described hereinafter and which will form the subject matter of claims appended hereto. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

In the drawings, closely related figures have the same number but different alphabetic suffixes. Drawing #1 includes FIG. 1-A and FIG. 1-B, and Drawing #2 includes FIG. 2-A and FIG. 2-B.

FIG. 1-A shows an electrode array that is used to make measurements of resistivity of a porous soil medium.

FIG. 1-B shows a section view of the test along the first line that is energized and tested.

FIG. 2-A shows a plan view of the electrical/mechanical Electrode Positioning Device.

FIG. 2-B shows a side view of the electrical/mechanical Electrode Positioning Device.

DESCRIPTION OF THE PREFERRED EMBODIMENT

The invention involves a process and apparatus requiring specific measurements using equipment consisting of a resistivity meter and a series of electrodes (in groups of four) set up in an array which directly measures the electrical resistivity of a porous medium, such as the clay based materials used as a fluid containment liner or infiltration barrier cap.

Electrical resistivity data are collected in the field and are used to calculate the in-situ permeability of the clay based materials at the time of field investigation. The test methodology includes a set of standard operational techniques for acquiring the electrical resistivity data which is used to quantify the porosity of the installed clay based material and qualitatively calculate the hydraulic conductivity of the in-situ clay based material.

The process involves measuring the resistivity of the pore filling fluid; empirically deriving a formation factor constant and a permeability constant based on the physical properties of the pore filling fluid and the porous medium; and then measure the resistivity of the saturated or partially saturated porous medium. The permeability of the material is directly related to its porosity and by measuring the in-situ porosity of the porous medium, the hydraulic conductivity can be calculated using the general geophysical-permeability equation (Anderson & Ehni, 1993)

Portable methods of assessing the change in hydraulic conductivity over time, require a portable system which is returned to the same location for measurements over a period of time. Both methods produce data at discrete time intervals providing data on the variation in hydraulic conductivity over any desired time interval.

Front-end geotechnical analysis is an industry standard practice for construction projects that use earthen materials. The invention uses a general geophysical-permeability equation (Anderson & Ehni 1993) that requires a set of empirically derived constants. The empirically derived constants that are used in the calculations for determining the hydraulic conductivity of the constructed clay based soil liner are established for each soil type product that is scheduled for use in the construction. For each homogenous porous material a set of constants are established for use in the general geophysical-permeability equation.

The empirically derived constants "n", "a", "m", and "C" are established by conducting pre-construction geotechnical tests. The pre-construction tests involve contemporary geotechnical permeability analysis in side-by-side analysis with the invention. A series of side-by-side tests are performed to establish an acceptable confidence level for repeatability for actual construction use with a given porous material that is considered geotechnically homogeneous. The general geophysical-permeability equation variables "n", "a", "m", and "C" are adjusted to yield the same number, or the best fit number, as the contemporary geotechnical techniques when calculating hydraulic conductivity ($K_{md}$). Then the variables "n", "a", "m", and "C" are set as constants for the given homogenous porous material. Once the constants are established, only two general geophysical-permeability equation variables, "$R_w$" and "S", are field measured at each test site during the construction phase of the project.

Reference Numerals in the Drawings are as follows:

1 Electrical Resistivity Meter, with a precision of plus-or-minus 0.05 milli-Ohms, this item is denoted by an "R" within a circle
2 Current Electrode
3 Potential Electrode
4 Potential Electrode
5 Current Electrode
6 Position of line two for energizing and sensing
7 Position of line three for energizing and sensing
8 Position of line four for energizing and sensing
9 Spherical Cap of Investigation; the Volume "V" is represented by the following equation; $V=\frac{1}{3}\Pi\, a^2\{3(1.625\, a)-a\}$; Where "a" is equal to the electrode separation, i.e. the distance between numeral references 2 and 3.
10 Depth of investigation, which is also equal to the electrode separation, i.e. the distance between numeral references 2 and 3.
11 Line of Equal Potential that represents electrical current flow into the porous soil medium from the Current Electrode, i.e. numeral reference 5, which is emitting an electrical field
12 Line of Equal Potential that represents electrical current flow into the porous soil from the Current Electrode, i.e. numeral reference 2, which is emitting an electrical field
13 Electrode Positioning Device, which is made of a rigid electrical insulating material
14 Distance between the electrodes, typically the separations are equal
15 Pivot Point, the center of the Rigid Electrical Insulator with a pointed projection that is used to reposition the electrodes during a testing procedure.

In FIG. 1-A and FIG. 1-B, the volume of material investigated is related to the electrode array employed. For an electrode array with an "a" Spacing of two feet, the volume of material evaluated with a sixteen point electrode spread, would be 32.5 cubic feet. The two Current Electrodes (numeral references 2 and 5) are positioned on the outside of the array and the two Potential Electrodes (numeral references 3 and 4) are positioned inside the array. In this schematic, four lines are each energized and tested separately. The first line that is tested is represented by the numeral references 2, 3, 4, and 5. The other three lines are represented by the numeral references 6, 7, and 8. these lines represent three 45° rotations around the center of the electrode array.

In FIG. 1-A and FIG. 1-B the electrodes are separated by an equal distance, which is known as the "a" Spacing. The "a" Spacing also represents the depth of investigation, FIG. 1-B numeral reference 10. The measured hydraulic conductivity for the sixteen electrode array assesses the volume of a spherical cap with a height equal to the array's "a" Spacing. The radius of the sphere cap is 1.625 times the "a" spacing.

The electrode apparatus is comprised of an Electrode Positioning Device and at least four electrodes which are connected to a resistivity meter. The Electrode Positioning Device (FIG. 2-A and FIG. 2-B; numeral reference 13) has numerous electrode receptacles, and is used for positioning the electrode sets at various locations in order to be able to select a variety of electrode arrays and maintain the same electrode spacing.

The Electrode Positioning Device is surface mounted on the porous soil medium (ground) that is being tested. The electrodes are all required to be in good contact with the surface of the material that is being tested. Surface mounting enables testing without damage to the soil that is being tested. The electrode positioning device is portable and has a pivoting mechanism (FIG. 2-A and FIG. 2-B numeral reference 15) in the center of it which maintains the electrode array in a central position allowing the electrode array to be rotated about it.

The invention initially uses existing geotechnical testing technologies to measure hydraulic conductivity at the surface for a side-by-side comparison with the invention. The comparison provides data to empirically establish the following equation factors:

n=Variable, usually very close to 2.0, for water saturation over 30% and increases to 10 for water saturation less than 1%.

a=Formation factor typically varying between 0.47 and 2.00; unitless. Empirically derived through side-by-side testing with contemporary technology (i.e. four Flexible Wall Permeability tests compared to four invention tests from the same sample sites, under the same conditions, during a test period).

m=Cementation exponent which usually varies from 1.3 to 2.0.

$C_K$=Empirically derived unitless constant that is related to the density of the solution that is determined through side-by-side testing with contemporary, 1980's & 1990's, geotechnical technology (e.g. Flexible Wall Permeability, Sealed Single Ring Infiltrometer tests, etc.)

The factors are used as formation standards for the soil type that is being tested with the invention. The ASTM published a testing procedure that is titled; *Standard Test Method for Measurement of Hydraulic Conductivity of Saturated Porous Material Using a Flexible Wall Permeameter*, ASTM, Vol. 04.08, October 1990. This procedure is one of the conventional test methods which is available to be used as an initial side-by-side comparison with the invention, to refine the formation factor numbers that are then used for additional testing with the invention of the same porous material (soil type) during the construction QC/QA monitoring program.

Once "n", "a", "m", and "$C_K$" are established for a given porous material type, then these constants are used routinely for subsequent hydraulic conductivity testing of the porous material type.

The irreducible water saturation "$Sw_{irr}$" is either determined by lab testing or is set at a whole number between 1 and 10. The "$Sw_{irr}$" is the percent irreducible water saturation (the number is typically represented in percentage form. i.e., Y %)

The percent soil moisture content "S" is field measured independently using standard geotechnical techniques and is included in the calculations as described below.

The resistivity of the permeant "$R_w$" is either measured in the field or in the lab prior to field investigation. "$R_w$" is equal to the resistivity of permeant (water plus dissolved salts or chemical constituents) in Ohm-meters as derived through physical measurements and calculations using equation 1 below. The test procedure includes mixing one part soil product with five parts water in a vessel that has a four electrode array installed in the bottom, then allowing the mixture to stabilize and the colloidal particles to settle, such that two consecutive resistivity measurements deviate by less than 2%. Then measuring the resistivity of the solution by using the four electrode array with the set "a" spacing and then calculating the resistivity of the permeant in Ohm-meters.

Geophysical formulas are employed with the invention for calculating the permeability of porous mediums. The formulas are listed in the sequence that they are used in the following section:

The present invention determines the permeability porous material by:

1. Measuring the resistivity of the porous medium and the pore filling fluid. The resistivity measurements are obtained by expanding on a technique first described by Schlumberger. The process is not dependent on the type of electrode array used; however, the most convenient one is the Wenner electrode array. The depth of investigation for the Wenner Array is equal to the "a" spacing.
2. Calculating the porosity of the porous medium by expanding on the theories initially developed G. E. Archie.
3. Calculating the permeability using the relationship of porosity to permeability as discussed by Wyllie-Rose, Tixier, Timur, and Coates-Dumanoir.

Using the work of Wenner, Archie and Wyllie-Rose, the mathematics used in this process can be summarized as follows:

1. Measurement of the bulk resistivity (porous medium and the pore filling fluid, i.e. permeant): Wenner Array, 1972, apparent resistivity:

$$R = \sigma_a = 2\Pi A_m \left( \frac{\Delta V}{I} \right) \quad \text{(equation 1)}$$

Where:
$\sigma_a$=Apparent Resistivity of the medium in Ohm-meters
$A_m$=Spacing distance of electrodes in meters
V=Volts
I=Current (amps)

2. Calculate the porosity of the medium by rearranging Archie's equations, which relate total resistivity (R) to a product of the resistivity of the permeant (Rw), the porosity ($\phi$), the percentage of saturation (S), and the resistivity of the formation (a): Archie, 1942, general form equation:

$$R = aR_W \Phi^{-m} S^{-n} \Rightarrow \Phi = \sqrt[m]{\frac{aR_W}{RS^n}} \quad \text{(equation 2)}$$

Where:
$\phi$=Porosity in a decimal form.
$R_w$=Resistivity of permeant (water plus dissolved salts or chemical constituents) in Ohms as derived through physical measurements and calculations using equation 1; $R_w=\sigma_a$ for the permeant when testing the resistivity of the pore filling fluid.
R=Observed resistivity (e.g. porous material) in Ohms as derived through physical measurements and calculations using equation 1; $R=\sigma_a$ for the porous material when testing the resistivity of the porous material.
S=Percent of the pore volume filled with permeant, (the number is typically represented in percentage form. i.e., X %)
n=Variable, usually very close to 2.0, for water saturation over 30% and increases to 10 for water saturation less than 1%.
a=Formation factor typically varying between 0.47 and 2.00; unitless. Empirically derived through side-by-side testing with contemporary technology (i.e. four Flexible Wall Permeability tests compared to four invention tests from the same sample sites, under the same conditions, during a test period).
m=Cementation exponent which usually varies from 1.3 to 2.0.

3. Calculate the permeability by utilizing the relationship of porosity and permeability and noting that there is a certain amount of bound water ($Sw_{irr}$ irreducible water saturation) which contributes to the net calculation of porosity-permeability; Wyllie/Rose, 1950, general expression:

$$\sqrt{K_{md}} = \frac{C_K \Phi^3}{Sw_{irr}} \Rightarrow K_{md} = \left( \frac{C_K \Phi^3}{Sw_{irr}} \right)^2 \quad \text{(equation 3)}$$

Where:
$K_{md}$=Hydraulic conductivity in milli-darcys
$\phi$=porosity, as determined by using equations 1 and 2
$C_K$=Empirically derived unitless constant that is related to the density of the solution that is determined through side-by-side testing with contemporary, 1980's & 1990's, geotechnical technology (e.g. Flexible Wall Permeability, Sealed Single Ring Infiltrometer tests, etc.) Once $C_K$ is established for a given porous material type, then that constant is used routinely for subsequent hydraulic conductivity testing of the porous material type.
$Sw_{irr}$=Percent irreducible water saturation (the number is typically represented in percentage form. i.e., Y %)

Therefore:

The general form of the geophysical-permeability equation is derived by combining equations 1, 2, and 3 into a single equation that yields a hydraulic conductivity number in millidarcys. The geophysical-permeability equation is as follows; Anderson & Ehni, 1993 synthesis:

$$K_{md} = \left( \frac{\left( \sqrt[m]{\frac{aR_w}{S^n \left( 2\pi A_m \frac{\Delta V}{I} \right)}} \right)^3}{Sw_{irr}} \right)^2 C_k \quad \text{(equation 4)}$$

The empirically derived constants "n", "a", "m", and "C" are established by conducting pre-construction geotechnical tests. The pre-construction tests involve contemporary geotechnical permeability analysis in side-by-side analysis with the invention. A series of side-by-side tests are performed to establish an acceptable confidence level of repeatability for actual construction use with a given porous material that is considered geotechnically homogeneous. The general geophysical-permeability equation variables "n", "a", "m", and "C" are adjusted to yield the same number, or the best fit number, as the contemporary geotechnical techniques when calculating hydraulic conductivity ($K_{md}$). Then the variables "n", "a", "m", and "C" are set as constants for the given homogenous porous material. Once the constants are established, only three general geophysical-permeability equation variables are field measured at each test site during the construction phase of the project. The resistivity of the permeant, represented in the equations above as "$R_w$," using a four electrode set array and then calculating the value in ohm-meters. The two field measured parameters are as follows:

R=Observed resistivity (e.g. porous material) in Ohms as derived through physical measurements and calculations using equation 1; $R=\sigma_a$ for the porous material when testing the resistivity of the porous material. Measured with the invention apparatus.

S=Percent of the pore volume filled with permeant, (the number is typically represented in percentage form. i.e., X %). Measured using conventional geotechnical procedures.

The hydraulic conductivity of the subject test is then calculated using the geophysical-permeability equation, Anderson & Ehni, 1993 synthesis, as identified above as equation 4.

Thus it will be understood that the present invention provides a novel approach to determining the hydraulic conductivity of a porous material. By utilizing the general geophysical permeability equation (equation 4) a user may conveniently and inexpensively determine the hydraulic conductivity using the resistivity of the porous material. Once a number of variables and constants have been determined for a given porous material, the hydraulic conductivity may be efficiently calculated many times. This is a significant advance over the prior art methods which require large amounts of time and effort to measure the hydraulic conductivity and which may also disturb the porous material. Never before has any method provided the means for calculating hydraulic conductivity as efficiently as the present invention.

SUMMARY

It may now be seen from the above description that the present invention provides a method and apparatus for determining the hydraulic conductivity of porous materials. Once the resistivity of the material has been obtained, this value may be inserted into a geophysical-permeability equation to calculate the hydraulic conductivity. They geophysical permeability equation also uses a number of constants which may be derived in various ways. These constants include the resistivity of a pore filling fluid, the resistivity of the porous material when the porous material is at least partially saturated with the pore filling fluid, a formation factor of the porous material, permeability constants of the porous material, and the in situ moisture content of the porous material. Once these constants are determined for a given material, they may be repeatedly used in calculating hydraulic conductivity.

The present invention also provides a method for measuring the resistivity of the porous material with an electrode positioning device. The device is placed on the surface of the porous material and the resistivity is measured through electrodes which are located on the device and in contact with the surface. The electrode positioning of the device may then be rotated to a new position and the resistivity may be remeasured. This may be repeated several times. The data obtained through the resistivity measurements may then be averaged to obtain an average resistivity value for a particular location. This process may be repeated in additional locations so that an average resistivity may be obtained for a given area of the porous material.

Once a first hydraulic conductivity value is calculated for a given location, additional values may be calculated after a period of time. The hydraulic conductivity values may then be compared to determine the change of the hydraulic conductivity over time.

A method of measuring the resistivity of the pore filling fluid is also disclosed which includes the step of mixing a sample of the porous material with the pore filling fluid. After colloidal particles are allowed to settle, the resistivity of the pore filling fluid is measured using the electrodes of the resistivity measuring device.

The present invention also includes a device for determining the hydraulic conductivity of a porous material. The device comprises a plurality of electrodes for conducting electrical current to and from the porous material. A resistivity meter is attached to the electrodes through an interfacing device, such as electrical wire. The device may also comprise an electrode positioning device for positioning electrodes in a predetermined spacial relationship.

Although the description above contains many specifications, these should not be construed as limiting the scope of the invention but as merely providing illustrations of some of presently preferred embodiments of this invention. For example, it is understood that various other equations may be used to calculate the variable and constants used in the present invention and still achieve the objects of the present invention. Furthermore, other measuring devices may be used to measure the variables and constants used in the present invention. Thus, the scope of the invention should be determined by the appended claims and their legal equivalents rather than by the examples given.

What is claimed is:

1. A geotechnical method of determining the in-situ hydraulic conductivity of a porous material under test (PMUT) by electrically probing said porous material's surface, comprising the steps of:

a) analyzing a standard sample of a material (SSM) with geotechnical characteristics similar to those of the PMUT, said SSM, after evaluation by independent methods, having known hydraulic conductivity "$K_{md}$", known saturation levels "S" of its pore filling fluid, known irreducible water saturation "$Sw_{irr}$", known permeant resistivity "$R_w$", known material resistivity "R", b) solving for SSM, equation system:

$$\Phi = \sqrt[m]{\frac{a R_W}{R S^n}}$$

and $$K_{md} = \left( \frac{C_K \Phi^3}{Sw_{irr}} \right)^2$$

where an iterative approach makes four unknowns converge to final values for the formation factor "a", the water saturation variable "n", the cementation exponent "m", and constant "$C_k$", of the SSM;

c) measuring in-situ the resistivity "R" of the PMUT with an electrical probe;

d) measuring by independent means, the moisture saturation "S" for the PMUT;

e) solving, for porosity "ϕ", and hydraulic conductivity "$K_{md}$" for PMUT, equation system $$\Phi = \sqrt[m]{\frac{a R_W}{R S^n}}$$

and $$K_{md} = \left( \frac{C_K \Phi^3}{Sw_{irr}} \right)^2$$

where S and R are obtained in steps c) and d) and $R_w$, a, n, m, $Sw_{irr}$, and $C_k$, are those of SSM.

2. The method of claim 1 wherein the step c) comprises reading resistivity values in multiple positions and averaging the results as "R".

3. The method of claim 1 wherein the step a) extracts the resistivity value of the permeant "$R_w$" of said porous material by electrode probing a mixture of the said the SSM and the pore filling fluid after allowing colloidal particles to settle and the dissolved salts within the mixture have stabilized to a state of equilibrium.

4. The method of claim 1 with further steps of:
f) repeating steps c) at multiple locations, and;
g) comparing, from location to location, the values for the hydraulic conductivity.

5. The method of claim 1 with further steps of:
h) repeating steps c) through e) after a predetermined time interval, and;
i) comparing the hydraulic conductivity for different times to measure the change of hydraulic conductivity.

6. The method of claim 1 wherein the electrical probe is comprised of at least four electrodes controlled by a positioning device.

7. The method of claim 6 wherein said electrical probe includes means for varying separation distances between the electrodes to obtain hydraulic conductivity measurements for variable depths beneath the electrode probe.

8. The method of claim 6 wherein said electrical probe is pivoted around a central perpendicular axis to reposition said electrodes.

9. A method of claim 1 where the resistivity of step c) is obtained by averaging measurements over multiple positions at the same locations when rotating the probe around a central perpendicular axis to reposition said electrodes.

10. A method of claim 1 where the evaluation of the SSM by independent methods comprises the application of the guidelines in ASTM D 5084-90 modified by using a non-conductive compaction mold with an installed Wenner array.

11. A method of claim 1 where the evaluation of the SSM by independent methods comprises the application of the guidelines in ASTM D 5093-90.

* * * * *